United States Patent
Seo et al.

(10) Patent No.: US 7,450,117 B2
(45) Date of Patent: Nov. 11, 2008

(54) APPARATUS AND METHOD FOR RESTORING ACTIVE SIGNAL AND SYNCHRONOUS SIGNAL

(75) Inventors: Sang-Il Seo, Gyeonggi-Do (KR); Ha-Jin Hwang, Gyeonggi-Do (KR); Chul-Yong Joung, Seoul (KR); Nam-Seok Jo, Gyeonggi-Do (KR); Dong-Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 1329 days.

(21) Appl. No.: 10/660,574

(22) Filed: Sep. 12, 2003

(65) Prior Publication Data

US 2004/0062239 A1 Apr. 1, 2004

(30) Foreign Application Priority Data

Sep. 16, 2002 (KR) ............... 10-2002-0056201
Sep. 16, 2002 (KR) ............... 10-2002-0056205

(51) Int. Cl.
*G06F 3/033* (2006.01)
*G09G 5/00* (2006.01)
*H04N 5/04* (2006.01)
*H04N 9/44* (2006.01)
*H04B 10/06* (2006.01)

(52) U.S. Cl. ............... 345/213; 398/202; 348/500
(58) Field of Classification Search ......... 345/211–213; 398/155, 166, 202–212; 348/500
See application file for complete search history.

(56) References Cited

U.S. PATENT DOCUMENTS 5,402,243 A * 3/1995 Ryu ..................... 348/500
6,977,677 B1* 12/2005 Shinohara ............. 348/211.5

FOREIGN PATENT DOCUMENTS

EP 0 999 501 A1 5/2000
JP 9-191417 A 7/1997

* cited by examiner

*Primary Examiner*—Bipin Shalwala
*Assistant Examiner*—Steven E Holton
(74) *Attorney, Agent, or Firm*—Birch, Stewart, Kolasch & Birch, LLP

(57) ABSTRACT

A synchronous signal/active signal restoring apparatus and method are disclosed in which a display device receives a digital image signal transmitted in an optical signal form from a source device through an optical cable, a physical medium which can not transmit a clock signal, and restores a horizontal/vertical synchronous signal and a horizontal/vertical active signal.

19 Claims, 8 Drawing Sheets

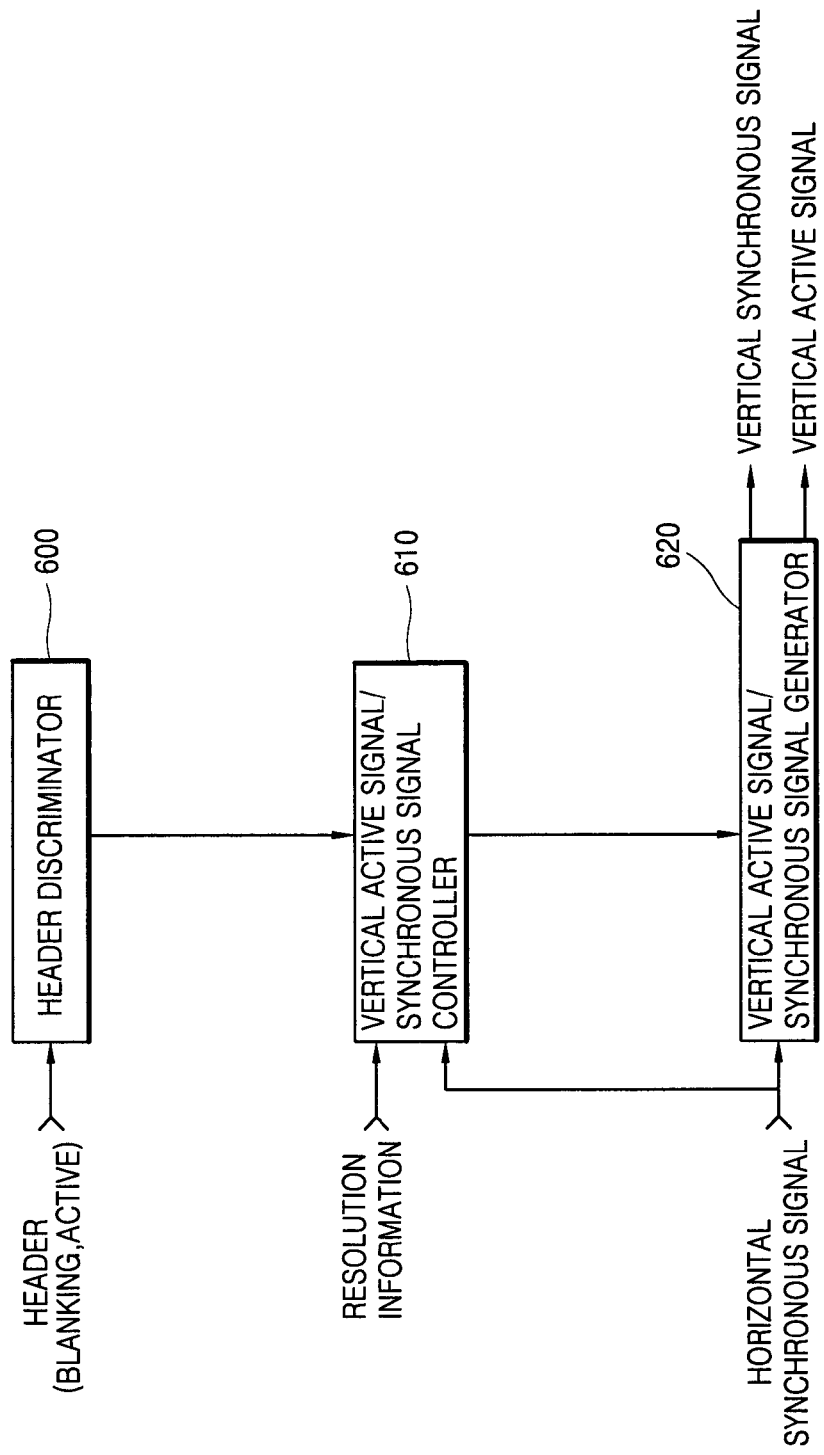

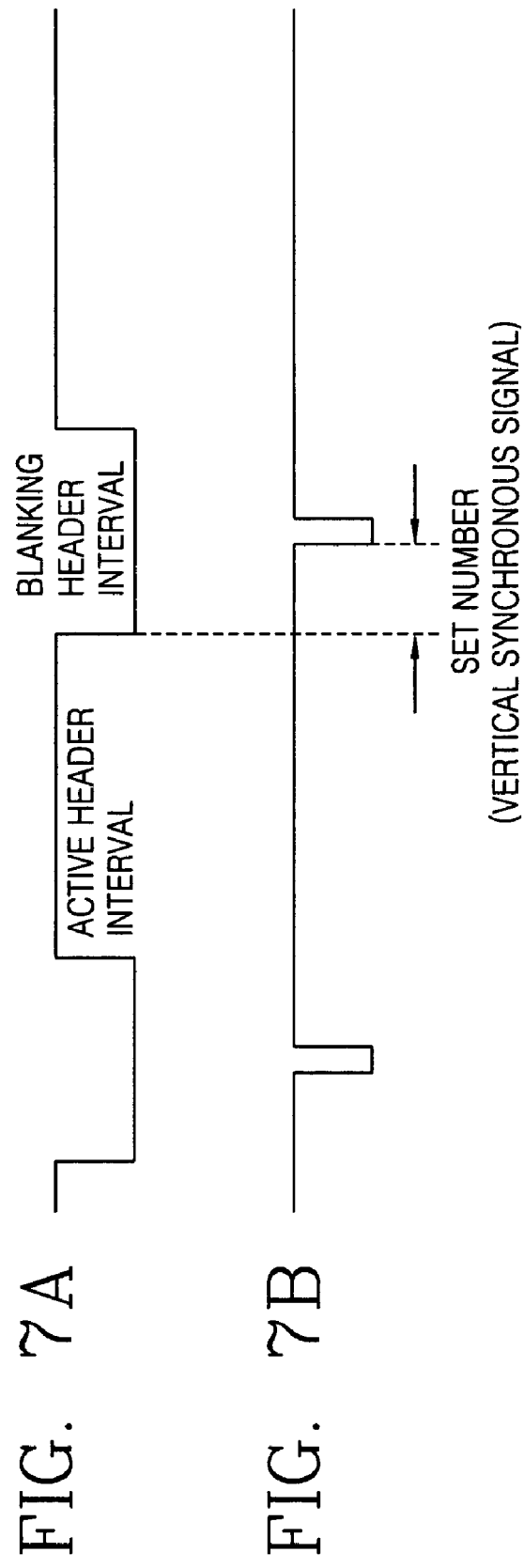

APPARATUS AND METHOD FOR RESTORING ACTIVE SIGNAL AND SYNCHRONOUS SIGNAL

This nonprovisional application claims priority under 35 U.S.C. § 119(a) on Patent Application Nos. 2002-056201 and 2002-0056205 filed in Korea on Sep. 16, 2002, which are herein incorporated by reference.

BACKGROUND OF THE INVENTION

1. Field of the Invention

The present invention relates to synchronous signal/active signal restoring apparatus and method, and more particularly, to a synchronous signal/active signal restoring apparatus and method in which a display device receives a digital image signal transmitted in an optical signal form from a source device through an optical cable, a physical medium which can not transmit a clock signal, and restores a horizontal/vertical synchronous signal and a horizontal/vertical active signal.

2. Description of the Background Art

In line with the development in electronic technology, a flat panel display (FPD) device has been developed and increasingly adopted as a display device such as a television receiver or a monitor to display an image, instead of a voluminous, large and heavy CRT.

The flat panel display device is classified into a device using an inorganic substance and a device using an organic substance. The device using the inorganic substance includes a PDP (Plasma Display Panel) using a PL (Photo Luminescence) and an FED (Field Emission Display) device using a CL (Cathode Luminescence). The device using an organic substance includes an LCD (Liquid Crystal Display element) and an organic EL (Electro-Luminescence) display device.

Among them, the PDP, since the advent of a large-scale PDP, is commonly adopted as a display screen of a display device such as the television receiver and the monitor because it has a high luminescence, a high-luminescence efficiency and a wide view angle, and can be fabricated at a low cost compared to other flat display device, has excellent heat-resistance, cold-resistance and dust-proof characteristics, easily implements a full color, and is light-weight.

In addition, the display device employing the PDP as a display screen is light-weight and thin, so that it has been developed also as a wall-mount type.

In order to output an image or a voice, an image signal or a voice signal outputted from a source device such as a set top box is inputted to the display device. For an image and voice output of the display device, conventionally, various cables are connected between the display device and the source device, so that an image signal or a voice signal of the source device is transmitted to and received from the display device through the cables, and a control signal is also transmitted and received between the display device and the source device through the cables.

Transmission and reception of an image/voice signal or various control signals transmitted and received between the display device and the source device through the cable will now be described.

FIG. 1 is an exemplary view showing connection relation between the display device and the source device in accordance with a conventional art.

Reference numeral 100 denotes a wall-mount type display device such as a wall-mount type monitor or a wall-mount type television receiver using the PDP as a display screen.

Reference numeral 110 is a digital device such as a digital VTR (Video Tape Recorder) or a DVD (Digital Video Disc) player outputting a transport packet stream corresponding to digital image signal and voice signal by reproducing a certain reproduction medium.

Reference numeral 120 is an analog device such as a VTR or a computer system outputting an analog image signal and voice signal by reproducing a reproducing medium such as a video tape.

Reference numeral 130 is a source device such as the set top box which receives a digital broadcast signal, receives the transport packet stream from the digital device 110 and the analog image signal and voice signal from the analog device 120 and selectively switches them, and transmits the switched signal to the display device 100.

In the conventional apparatus, plural digital devices 110 and the source device 130 are connected by a cable such as an IEEE 1394 cable, and the digital device 110 outputs the transport packet stream corresponding to a digital image and voice signals obtained by reproducing a certain reproducing medium. The outputted transport packet stream is transmitted to the source device 130 through the IEEE 1394 cable The analog device 120 and the source device 130 are connected by a coaxial cable. The analog device 120 reproduces a certain reproduction medium and generates an analog image signal, analog R, G, B signal or an analog voice signal. The generated analog signals are transmitted to the source device 130 through the coaxial cable.

The source device receives a digital broadcast signal by means of an internal ATSC (Advanced Television Systems Committee) tuner, and converts the transport packet stream corresponding to the received digital broadcast signal and the transport packet stream inputted from the digital device 110 into an analog image signal and an analog voice signal.

And then, the source device selectively switches the converted analog image signal and the analog voice signal, and the analog image signal and the voice signal inputted from the analog device 120, and transmits them to the display device 100. At this time, the source device 130 transmits the analog R,G,B signal and the analog voice signal of channels L and R to the display device 100 through each cable.

Between the display device 100 and the source device 130, an additional control/response cable is connected, through which a control signal and a response signal according to the control signal are transmitted.

However, the conventional art has the following problems. That is, because the display device 100 and the source device 130 are connected by several cables, if the display device 100 is installed on a wall as a wall-mounted type and the source device 130 is installed on a shelf, the cable for transmitting the analog R,G, B signal and the analog voice signal and the cable for transmitting the control signal and the response signal to the control signal are exposed at the wall exposed between the display device 100 and the source device 130. The exposed cable is not good for appearance.

Therefore, instead, the display device 100 and the source device 130 may be connected by one thin optical cable which can be hardly recognized at a distance. Then, the source device 130, the source device 130 converts an image signal, a voice signal, a control signal, image signal characteristics and voice signal characteristics into an optical signal and transmits it to the display device through an optical fiber, and the display device 100 receives and processes the optical signal.

In order for the source device 130 to transmit various signals in an optical signal form to the display device 100 through the optical fiber, a 8 bit data should be converted into a 10 bit data so as to be suitably transmitted, and the optical signal should be converted into a predetermined format of serial data because the optical signal can not be transmitted as a parallel data.

Thus, the source device 130 selects various signals in order of a predetermined format, encodes them, converts the 8 bit parallel data into 10 bit data, converts again the 10 bit parallel data into serial data, and then transmits them in an optical form through the optical fiber.

FIG. 2 shows a format structure of a serial data having image/voice/control signal and image/voice signal characteristics in a packet form transmitted from the source device to the display device.

A reference numeral 200 is an image signal packet with the largest data capacity. The image signal packet 20 includes include one horizontal line of image signal. As for a header of the image signal, if the image signal is a blanking section, a blanking header is formed, whereas if the image signal is the active section, an active header is formed. And a tail is successively formed behind the image signal.

Between the image signal packets 200, there are positioned a voice signal packet 202, a control signal packet 204, an image signal characteristic packet 206 and a voice signal characteristic packet 208, and a header and a tail are formed ahead and behind each packet. The packets positioning order may be changed.

The serial data with such a format structure is encoded and then converted into a 10 bit data suitable for optical signal transmission, and converted into an optical signal in an optical signal transmitter, and transmitted to the display device 100 through an optical fiber.

At this time, the optical fiber, a physical medium for transmitting the optical signal, is not able to transmit a clock signal that the source device 130 has used to process an image signal, to the display device 100.

Even though a clock signal is not inputted from the source device 130, the display device 100 may judge an approximate frequency of a clock signal for restoring an image signal through an image signal characteristic packet received from the source device 130 and generate a clock signal with the judged approximate frequency.

However, the clock signal generated by the display device 100 can not be the same as the clock signal used in the source device 130, it is not possible to restore accurate horizontal/vertical synchronous signal and horizontal/vertical active signal.

SUMMARY OF THE INVENTION

Therefore, an object of the present invention is to provide an active signal/synchronous signal restoring apparatus and method for restoring horizontal/vertical synchronous signal horizontal/vertical active signal from an optical signal received from a source device.

Another object of the present invention is to provide a horizontal active signal/synchronous signal restoring apparatus and method in which, by using a header of an image signal packet included in an optical signal transmitted from a source device, the number of clock signals within one horizontal synchronization period is accurately set and a horizontal active signal/synchronous signal is restored.

To achieve these and other advantages and in accordance with the purpose of the present invention, as embodied and broadly described herein, there is provided a synchronous signal/active signal restoring apparatus including: an optical signal receiving unit for receiving an optical signal through an optical fiber from a source device; a serial/parallel converter for converting a serial data of the optical signal received from the optical signal receiver into a parallel data; a decoder for converting the 10 bit parallel data outputted from the serial/parallel converter into an 8 bit parallel data; an image signal processor for separating an image signal, a header and a tail from an image signal packet among output signals decoded from the decoder, and recognizing resolution information of the image signal through the image signal characteristic packet; a clock signal generator for generating a clock signal with a predetermined frequency according to the resolution information recognized by the image signal processor; a horizontal active signal/synchronous signal restoring unit for receiving the header, the tail and the resolution information from the image signal processor, and restoring horizontal synchronous signal/active signal; a vertical active signal/synchronous signal restoring unit for receiving the header and the resolution information from the image signal processor and the horizontal synchronous signal from the horizontal active signal/synchronous signal generator, and restoring a vertical synchronous signal/active signal; and an image signal outputting unit for receiving the separated image signal from the image signal processor, and outputting an image signal according to the horizontal active signal restored in the horizontal active signal/synchronous restoring unit.

The horizontal active signal/synchronous signal restoring unit includes: an image signal reception recognizing unit for recognizing reception of the image signal through the header and the tail separated in the image signal processor; a horizontal active signal/synchronous signal controller for controlling generation of the horizontal active signal and counting predetermined number of clock signals according to the resolution information on the basis of the horizontal active signal, to thereby control generation of a horizontal synchronous signal; and a horizontal active signal/synchronous signal generator for generating a horizontal active signal and a horizontal synchronous signal under the control of the horizontal active signal/synchronous signal controller.

The vertical active signal/synchronous signal restoring unit includes: a header discriminator for discriminating whether a header inputted from the image signal processor is a blanking header or an active header; a vertical active signal/synchronous signal controller for controlling generation of a vertical active signal according to an output signal of the header discriminator and counting predetermined number of horizontal synchronous signals according to resolution information on the basis of the vertical active signal, to thereby control generation of the vertical synchronous signal; and a vertical active signal/synchronous signal generator for generating a vertical active signal and a vertical synchronous signal under the control of the vertical active signal/synchronous signal controller.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a detailed block diagram showing a construction of a vertical active signal/synchronous signal restoring unit of the active signal/synchronous signal restoring apparatus in accordance with the present invention;

FIGS. 7A and 7B show waveforms of a vertical active/synchronous signal restored by the vertical active/synchronous signal restoring unit of FIG. 6;

DETAILED DESCRIPTION OF THE PREFERRED EMBODIMENTS

An active signal/synchronous signal restoring apparatus of the present invention will now be described with reference to FIGS. 3 through 9.

Figure 1:
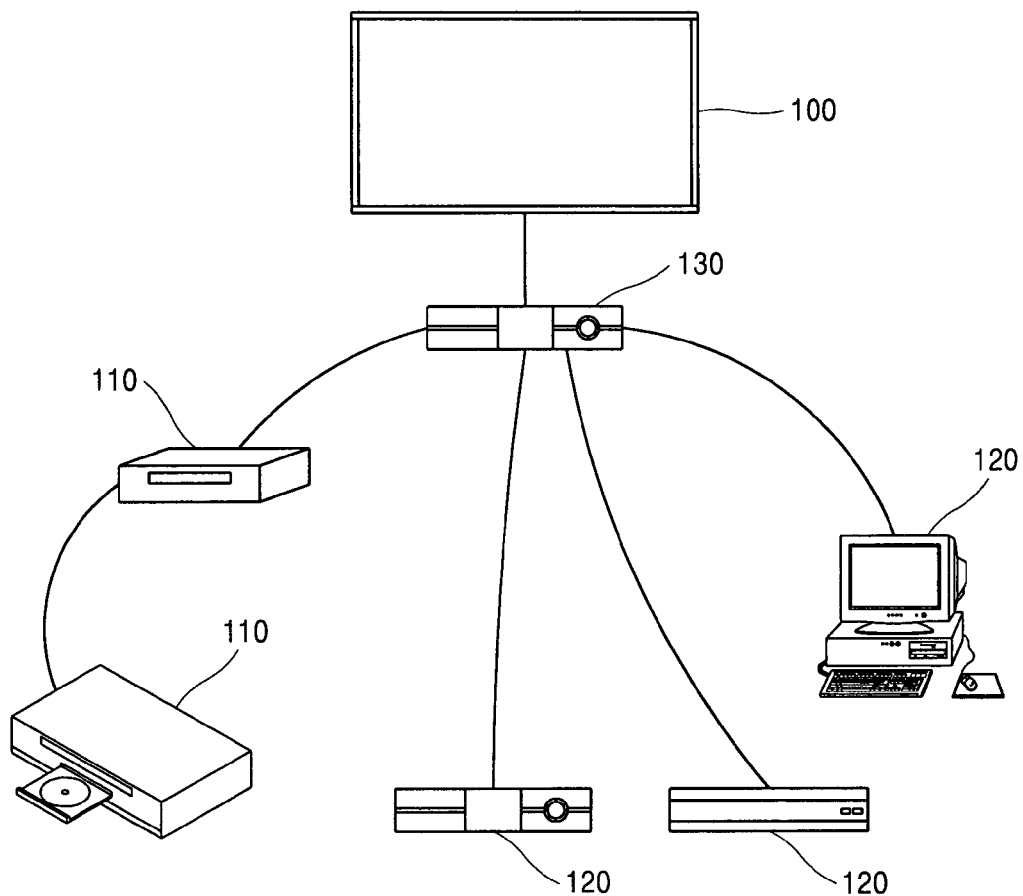
FIG. 1 is an exemplary view showing how a display device and a source device are connected.
Figure 2:
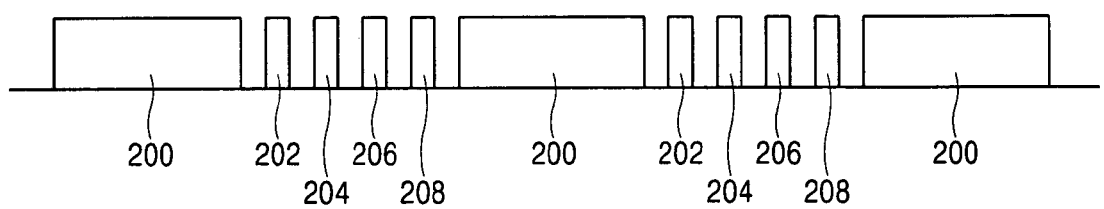
FIG. 2 shows a format structure of a serial data having image/voice/control signal and image/voice signal characteristics in a packet form transmitted from the source device to the display device.
Figure 3:
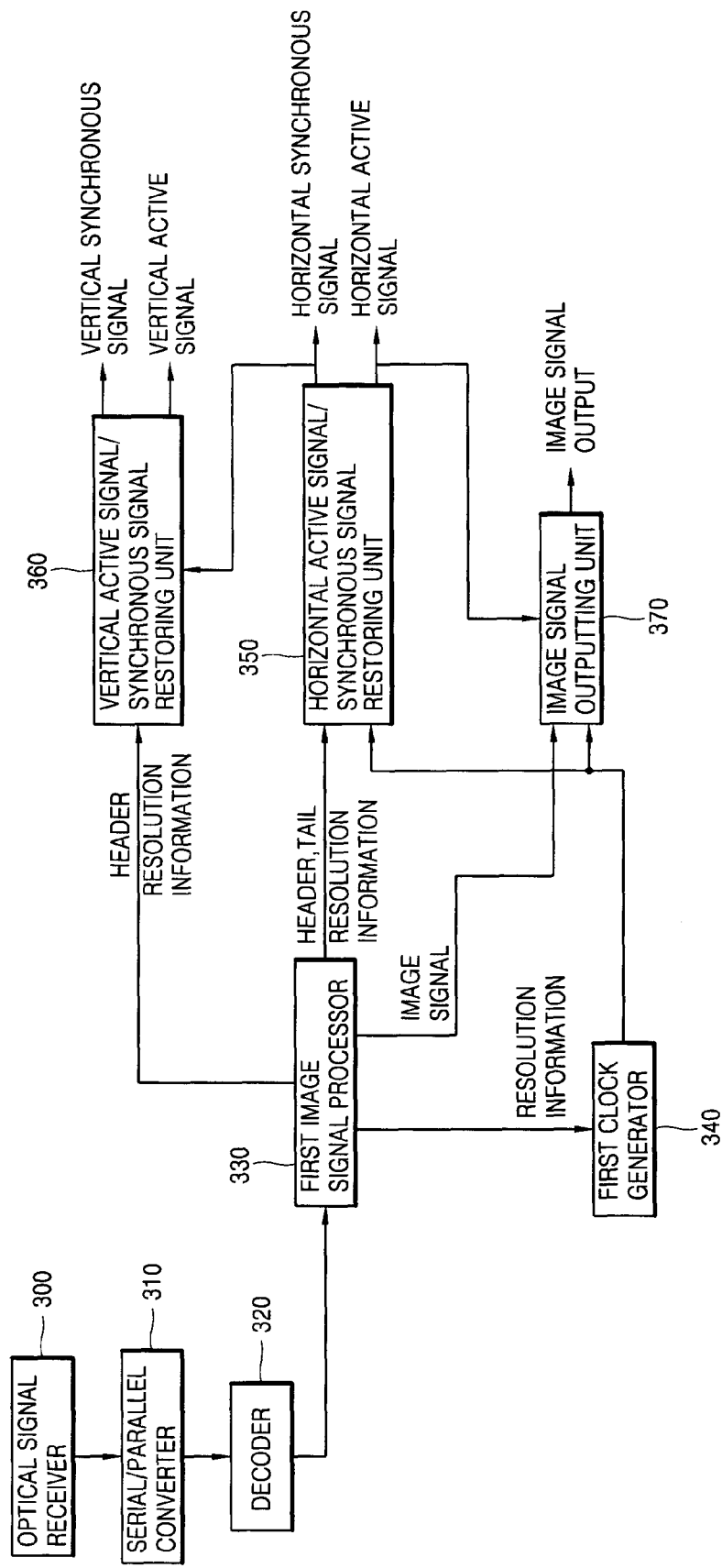
FIG. 3 is a schematic block diagram of an active signal/synchronous signal restoring apparatus in accordance with one embodiment of the present invention.

FIG. 3 is a schematic block diagram of an active signal/synchronous signal restoring apparatus in accordance with one embodiment of the present invention.

As shown in FIG. 3, the synchronous signal/active signal restoring apparatus includes: an optical signal receiving unit 300 for receiving an optical signal through an optical fiber from a source device; a serial/parallel converter 310 for converting a serial data of the optical signal received from the optical signal receiver 300 into a parallel data; a decoder 320 for converting the 10 bit parallel data outputted from the serial/parallel converter 310 into an 8 bit parallel data; a first image signal processor 330 for separating an image signal, a header and a tail from an image signal packet among output signals decoded from the decoder, and recognizing resolution information of the image signal through the image signal characteristic packet; a first clock signal generator 340 for generating a clock signal with a predetermined frequency according to the resolution information recognized by the first image signal processor 330; a horizontal active signal/synchronous signal restoring unit 350 for receiving the header, the tail and the resolution information from the first image signal processor 330, and restoring horizontal synchronous signal/active signal; a vertical active signal/synchronous signal restoring unit 360 for receiving the header and the resolution information from the first image signal processor 330 and the horizontal synchronous signal from the horizontal active signal/synchronous signal generator 350, and restoring a vertical synchronous signal/active signal; and an image signal outputting unit 370 for receiving the separated image signal from the first image signal processor 330, and outputting an image signal according to the horizontal active signal restored in the horizontal active signal/synchronous restoring unit.

The operation of the active signal/synchronous signal restoring apparatus constructed as described above will now be explained in detail.

First, the optical signal receiver 300 receives an optical signal transmitted through an optical fiber after being converted into a predetermined format of serial data from a source device, and the serial/parallel converter 310 converts the serial data of the received optical signal into a 10 bit parallel data and outputs it.

Thereafter, the decoder 320 decodes the 10 bit parallel data outputted from the serial/parallel converter 310 and converts it into a 8 bit parallel data, and the first image signal processor 330 processes an image signal packet among output signals of the decoder 320 to separate a header, a tail and an image signal, and processes an image signal characteristic packet to recognize resolution information of the image signal.

The resolution information can be recognized by using the header. In other words, the horizontal lines varies in number depending on the resolution, and the first image signal processor 330 counts the number of active headers and recognizes the resolution information by using the counted number of active headers.

The resolution information outputted to the first image signal processor 330 is inputted to the first clock generator 340, and the first clock generator 340 generates a clock signal of a predetermined frequency according to the resolution information and inputs the generated clock signal to the horizontal active signal/synchronous signal restoring unit 350 and the image signal outputting unit 370.

In other words, in the display device, a different frequency of a clock signal is used depending on the resolution of the image signal, and the first clock generator 340 generates a clock signal of a predetermined frequency according to the resolution recognized by the first image signal processor 330.

Thereafter, the header, the tail and the resolution information outputted from the first image signal processor 330 are inputted to the horizontal active signal/synchronous signal restoring unit 350, and the horizontal active signal/synchronous signal restoring unit 350 is synchronized with the clock signal according to the header and the tail, to thereby generate a horizontal active signal and also generate a horizontal synchronous signal by using the horizontal active signal, the resolution information and the clock signal.

The horizontal active signal generated by the horizontal active signal/synchronous signal restoring unit 350 is inputted together with the image signal outputted from the first image signal processor 330 and the clock signal generated by the first clock generator 340 to the image signal outputting unit 370. Then, the image signal outputting unit 370 outputs an image signal at an active interval of the horizontal active signal according to the clock signal.

Meanwhile, the horizontal synchronous signal generated by the horizontal active signal/synchronous signal restoring unit 350 is inputted together with the header and the resolution information outputted from the first image signal processor 330 to the vertical active signal/synchronous signal restoring unit 360.

Thereafter, the vertical active signal/synchronous signal restoring unit 360 judges whether the header outputted from the first image signal processor 330 is a blanking header or an active header, generates a vertical active signal according to the type of the header as judged, and generates a vertical synchronous signal by using the vertical active signal, the resolution information and the horizontal synchronous signal.

Figure 4:
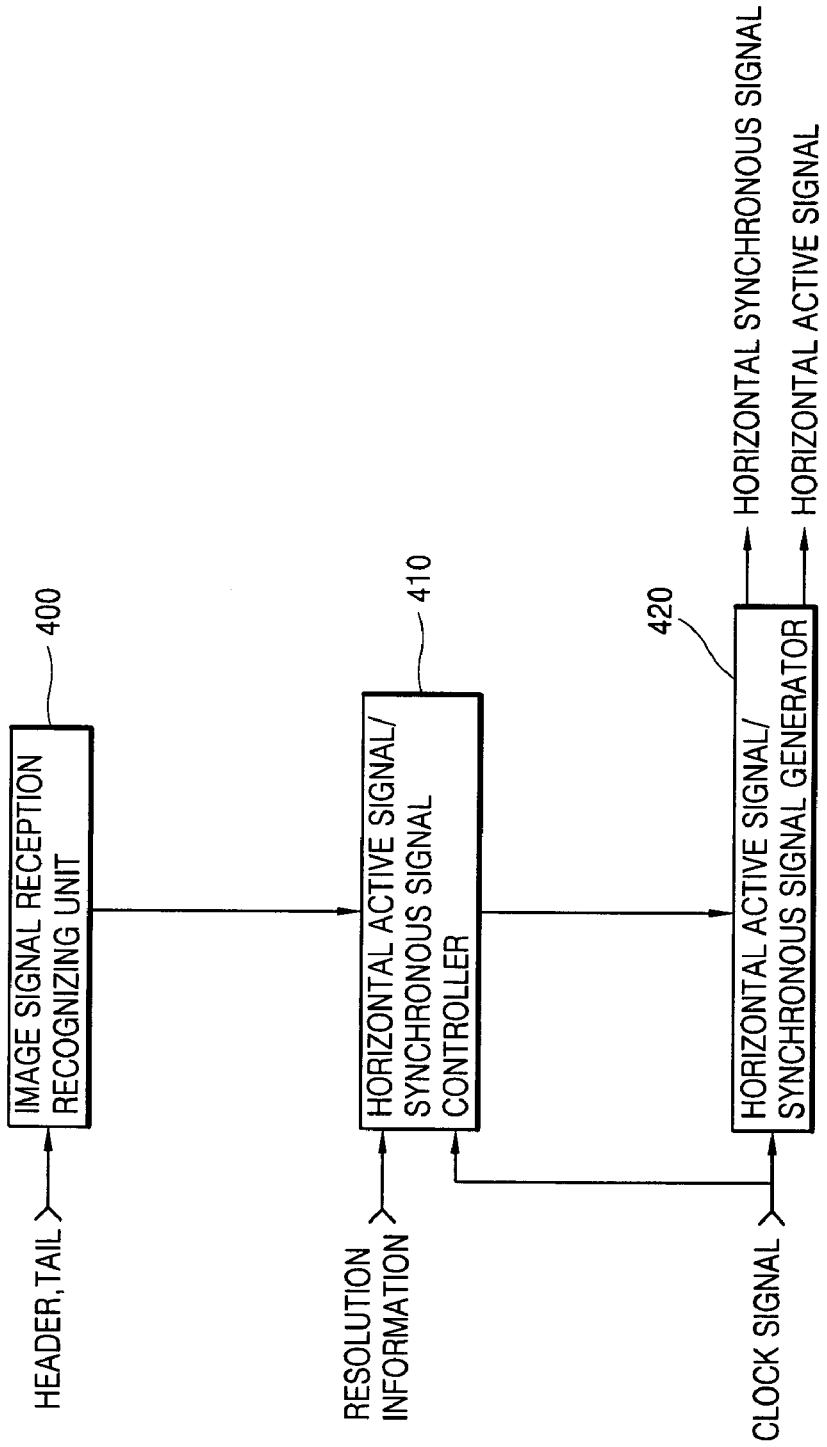
FIG. 4 is a detailed block diagram showing a construction of a horizontal active signal/synchronous signal restoring unit of the active signal/synchronous signal restoring apparatus in accordance with the present invention.

FIG. 4 is a detailed block diagram showing a construction of a horizontal active signal/synchronous signal restoring unit of the active signal/synchronous signal restoring apparatus in accordance with the present invention.

The horizontal active signal/synchronous signal restoring unit 350 includes: an image signal reception recognizing unit 400 for recognizing reception of the image signal through the header and the tail separated in the first image signal processor 330; a horizontal active signal/synchronous signal controller 410 for controlling generation of the horizontal active signal and counting predetermined number of clock signals according to the resolution information on the basis of the horizontal active signal, to thereby control generation of a horizontal synchronous signal; and a horizontal active signal/synchronous signal generator 420 for generating a horizontal active signal and a horizontal synchronous signal under the control of the horizontal active signal/synchronous signal controller.

Figure 5A:
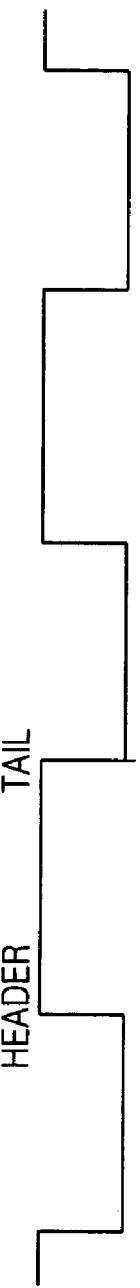
FIGS. 5A and 5B show waveforms of a horizontal active/synchronous signal restored by the horizontal active/synchronous signal restoring unit of FIG. 4.
Figure 5B:
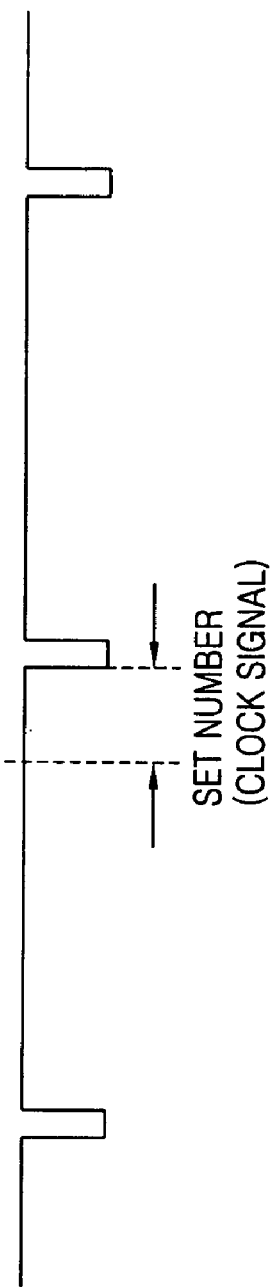

The operation of the horizontal active signal/synchronous signal restoring unit 350 constructed as described above will now be explained with reference to FIGS. 5A and 5B showing waveforms of a horizontal active/synchronous signal restored by the horizontal active/synchronous signal restoring unit 350.

First, the image signal reception recognizing unit 400 of the horizontal active signal/synchronous signal restoring unit 350 recognizes reception of an image signal by using the header and the tail inputted from the first image signal processor 330, and outputs a corresponding recognition signal to the horizontal active signal/synchronous signal controller 410.

The horizontal active signal/synchronous signal controller 410 controls the horizontal active signal/synchronous signal generator 420 according to the recognition signal, to thereby generate a horizontal active signal as shown in FIG. 5A.

In addition, the horizontal active signal/synchronous signal controller 410 judges resolution of the image signal by the resolution information inputted from the first image signal processor 330, and counts clock signals from a position of a tail at a time point when the image signal is not received yet.

And then, the horizontal active signal/synchronous signal controller 410 controls the horizontal active signal/synchronous signal generator 420 according to the counted number of clock signals according to the resolution, thereby generating a horizontal synchronous signal as shown in FIG. 5B.

FIG. 6 is a detailed block diagram showing a construction of a vertical active signal/synchronous signal restoring unit of the active signal/synchronous signal restoring apparatus in accordance with the present invention.

As shown in FIG. 6, the vertical active signal/synchronous signal restoring unit 360 includes: a header discriminator 600 for discriminating whether a header inputted from the first image signal processor 330 is a blanking header or an active header; a vertical active signal/synchronous signal controller 610 for controlling generation of a vertical active signal according to an output signal of the header discriminator 600 and counting predetermined number of horizontal synchronous signals according to resolution information on the basis of the vertical active signal, to thereby control generation of the vertical synchronous signal; and a vertical active signal/synchronous signal generator 620 for generating a vertical active signal and a vertical synchronous signal under the control of the vertical active signal/synchronous signal controller 610.

The operation of the vertical active signal/synchronous signal restoring unit 360 constructed as described above will now be explained with reference to FIGS. 7A and 7B showing waveforms of a vertical active/synchronous signal restored by the vertical active/synchronous signal restoring unit 360.

First, the header discriminator 600 of the vertical active signal/synchronous signal restoring unit 360 discriminates whether the header inputted from the first image signal processor 330 is a blanking header or an active header, and outputs a corresponding recognition signal. The outputted recognition signal is inputted to the vertical active signal/synchronous signal controller 610.

The vertical active signal/synchronous signal controller 610 controls the vertical active signal/synchronous signal generator 620 according to the recognition signal, to thereby generate a vertical active signal as shown in FIG. 7A. In other words, the vertical active signal/synchronous signal controller 610 generates the vertical active signal which is active during an interval where the active header is successively recognized and blank during an interval where the blanking header is successively recognized.

In addition, the vertical active signal/synchronous signal controller 610 judges resolution of the image signal by the resolution information inputted from the first image signal processor 330, and counts horizontal synchronous signal at a time point where the blanking state starts. And then, the vertical active signal/synchronous signal controller 610 controls the vertical active signal/synchronous signal generator 620 according to the counted horizontal synchronous signals according to the resolution, thereby generating a vertical synchronous signal as shown in FIG. 7B.

Figure 8:
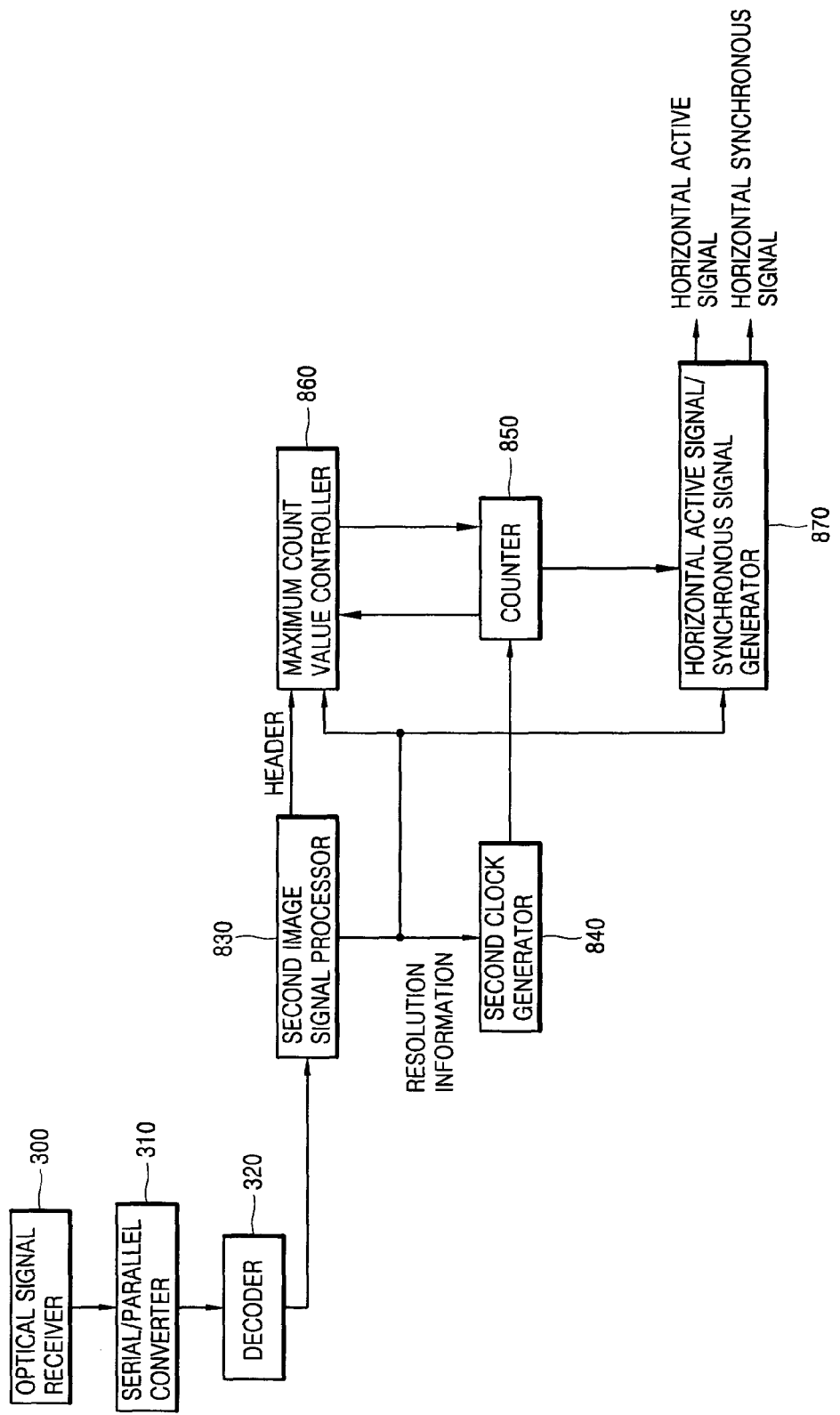
FIG. 8 is a schematic block diagram of an active signal/synchronous signal restoring apparatus in accordance with another embodiment of the present invention.

FIG. 8 is a schematic block diagram of an active signal/synchronous signal restoring apparatus in accordance with another embodiment of the present invention.

As shown in FIG. 8, the active signal/synchronous signal restoring apparatus includes: an optical signal receiver 300 for receiving an optical signal through an optical fiber from a source device; a serial/parallel converter 310 for converting a serial data of the optical signal received from the optical signal receiver 300 into a parallel data; a decoder 320 for converting a 10 bit parallel data outputted from the serial/parallel converter 310 into an 8-bit parallel data; a second image signal processor 830 for separating an image signal, a header and a tail from an image signal packet among output signals decoded from the decoder, and recognizing resolution information of the image signal through the image signal characteristic packet; a second clock signal generator 840 for generating a clock signal with a predetermined frequency according to the resolution information recognized by the second image signal processor 830; a counter 850 for counting a clock signal generated by the second clock signal generator 840; a maximum count value controller 860 for setting a maximum count value according to the resolution information recognized by the second image signal processor 830, and variably setting the maximum count value depending on whether the counter 850 counts a pre-set maximum count value within a period of the header recognized by the second image signal processor 830; and a horizontal active signal/synchronous signal generator 870 for generating a horizontal active signal and a horizontal synchronous signal as the counter 850 counts a pre-set value according to the resolution information recognized by the second image signal processor 830.

Figure 9:
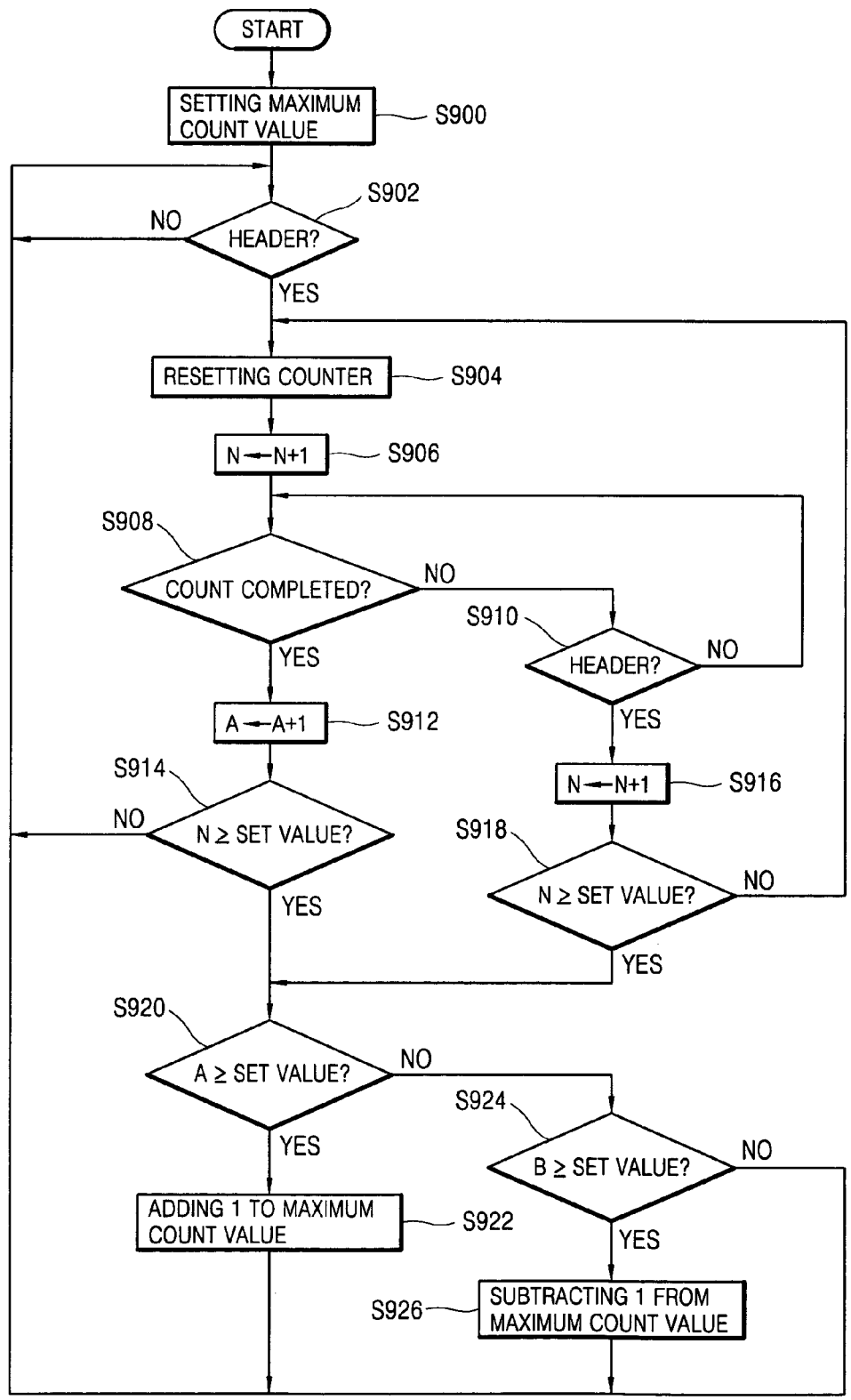
FIG. 9 is a flow chart of an operation of a maximum count value controller of FIG. 8.

With reference to FIGS. 8 and 9, the active signal/synchronous signal restoring apparatus in accordance with another embodiment of the present invention will now be described.

In the active signal/synchronous signal restoring apparatus in accordance with another embodiment of the present invention, the optical signal receiver 300 and the serial/parallel converter 310 and the decoder 320 are the same as those in FIG. 3, of which descriptions are thus omitted.

First, the second image signal processor 830 processes an image signal packet among output data of the decoder 320 to separate a header and processes an image signal characteristic packet to recognize resolution information of the image signal. The resolution information can be recognized by using the header.

In other words, the second image signal processor 830 can count the number of active headers and recognize the resolution information on the basis of the counted number of the active headers.

Thereafter, the resolution information is outputted to the second clock generator 840, the maximum count controller 860 and the horizontal active signal/synchronous signal generator 870.

The second clock generator 840 generates a clock signal with a pre-set frequency according to the resolution information inputted from the second image signal processor 830, and the generated clock signal is inputted to the counter 850 and counted.

The operation of the maximum count value controller 860 will now be described in detail with reference to FIG. 9.

FIG. 9 is a flow chart of the operation of the maximum count value controller 860 of FIG. 8.

First, the maximum count value controller 860 sets a maximum count value of the counter 850 according to the resolution information recognized by the second image signal processor 830 (step S900), and judges whether a header has been inputted from the second image signal processor 830 (step S902).

When a header has been inputted from the second image signal processor 830, the maximum count value controller 860 resets the counter 850 so that the counter 850 counts the clock (step S904), and adds 1 to the count number of the clock signals of the counter 850 (step S906).

Next, it is judged whether the counter 850 has counted the pre-set maximum count value (step S908). If the counter 850 has not count the pre-set maximum count value yet, it is judged whether a header has been inputted from the second image signal processor 830 (step S910).

According to the judgment result (step S908), if the counter 850 has counted the pre-set maximum count value, the maximum count value controller 860 adds 1 to the maximum count completion number (A) (step S912).

Thereafter, it is judged whether the clock signal count number (N) is greater than the pre-set value (step S914). If the clock signal count number (N) is not greater than the pre-set value, it returns to the step S902 so that the operation that the header is inputted, the counter 850 is reset to count a clock signal, and 1 is added to the count number(N) is repeatedly performed.

Before the counter 850 counts the maximum count value, if the header is first inputted from the second image signal processor 830 (step S910), the maximum count value controller 860 adds a to the header input number (B) (step S916).

Thereafter, it is judged whether the clock signal count number (N) is greater than the pre-set value (step S918). If the clock signal count number (N) is not greater than the pre-set value, it returns to the step S904, so that the operation that the counter 850 is reset to count a clock signal and 1 is added to the clock signal count number (N) is repeatedly performed.

If the clock signal count number (N) is greater than the pre-set value, the maximum count value controller 860 judges whether the count number (A) of the maximum count value by the counter 850 before the header is inputted is greater than the pre-set value (step S920). If the count number (A) is greater than the pre-set value, the maximum count value controller 860 adds 1 to the maximum count value and sets the same value at the counter 850 (step S922).

However, if the count number (A) is not greater than the pre-set value, the maximum count value controller 860 judges whether the header input number (B) is greater than the pre-set value before the counter 850 counts the maximum count value (step S924). If the header input number (B) is greater than the pre-set value, the maximum count value controller 860 subtracts 1 from the maximum count value, sets the corresponding value at the counter 850 (step S926), and returns to the step S902 so that the operations are repeatedly performed to set the maximum count value of the counter 850.

The process of setting the maximum count value of the counter 850 will now be described by taking an example.

After the clock signal count number (N) is set to 10, the counter 850 counts the clock signals until the header is inputted for 10 times. After the counter 850 counts 10 times, if the counter has counted the maximum count value more than six times before the header is inputted, the maximum count value is increased by 1 and set in the counter 850. If the header input number (B) is more than six times before the counter 850 counts the maximum count value, 1 is subtracted from the maximum count value of the counter 850 and set in the counter 850.

Finally, as shown in FIG. 8, the horizontal active signal/synchronous generator 870 judges a horizontal active signal generation count value and a horizontal synchronous generation count value which have been previously set according to the resolution information recognized by the second image signal processor 830, and as the count value of the counter 850 becomes the horizontal active signal generation count value, the horizontal active signal/synchronous signal generator 850 generates the horizontal active signal, while as the count value of the counter 850 becomes the horizontal synchronous signal generation count value, the horizontal active signal/synchronous signal generator 850 generates the horizontal synchronous signal.

In the above descriptions, the source device and the display device uses the optical fiber as a physical medium for transmitting the image signal, but besides the optical fiber, the source device and the display device can also transmit the image signal through various other physical medium which may not transmit the clock signal.

As so far described, the synchronous signal/active signal restoring apparatus and method of the present invention have the following advantages.

That is, the number of clock signals between 1 horizontal lines can be accurately set by using a signal received through the physical medium that may not transmit a clock signal, and the horizontal active signal/synchronous signal is restored according to the count value of the clock signals. Therefore, a change in the horizontal synchronous signal and the vertical synchronous signal can be minimized, and thus, an image signal can be accurately restored to reproduce a clean image without being shaken or noise.

In addition, because the horizontal synchronous signal/active signal and vertical synchronous/active signal are accurately restored by using the signal received through the physical medium that may not transmit a clock signal, a clean image can be displayed without being shaken or a noise on a display screen.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A synchronous signal/active signal restoring apparatus comprising:
   an optical signal receiving unit for receiving an optical signal through an optical fiber from a source device;
   a serial/parallel converter for converting a serial data of the optical signal received from the optical signal receiver into 10 bit parallel data;
   a decoder for converting the 10 bit parallel data outputted from the serial/parallel converter into an 8 bit parallel data;
   a first image signal processor for separating an image signal, a header and a tail from an image signal packet among output signals decoded from the decoder, and recognizing resolution information of the image signal through the image signal characteristic packet;
   a first clock signal generator for generating a clock signal with a predetermined frequency according to the resolution information recognized by the first image signal processor;
   a horizontal active signal/synchronous signal restoring unit for receiving the header, the tail and the resolution information from the first image signal processor, and restoring horizontal synchronous signal/active signal;
   a vertical active signal/synchronous signal restoring unit for receiving the header and the resolution information from the first image signal processor and the horizontal synchronous signal from the horizontal active signal/synchronous signal generator, and restoring a vertical synchronous signal/active signal; and
   an image signal outputting unit for receiving the separated image signal from the first image signal processor, and outputting an image signal according to the horizontal active signal restored in the horizontal active signal/synchronous restoring unit.

2. The apparatus of claim 1, wherein the first image signal processor counts the number of active headers, and recognizes resolution information by using the counted number of active headers.

3. The apparatus of claim 1, wherein the resolution information is recognized as the number of active headers consecutive in the image signal packet.

4. The apparatus of claim 1, wherein the horizontal active signal/synchronous signal restoring unit generates a horizontal active signal by being synchronized with the clock signal according to the header and the tail inputted from the first image signal processor, and generates the horizontal synchronous signal by using the horizontal active signal, the resolution information and the clock signal.

5. The apparatus of claim 1, wherein the vertical active signal/synchronous signal restoring unit judges whether the header outputted from the first image signal processor is a blanking header or an active header, generates a vertical active signal according to the judged type of the header, and generates a vertical synchronous signal by using the vertical active signal, the resolution information and the horizontal synchronous signal.

6. The apparatus of claim 1, wherein the image signal outputting unit receives the horizontal active generated by the horizontal active signal/synchronous signal restoring unit, the image signal outputted from the first image signal processor, and the clock signal generated by the first clock generator, and outputs an image signal according to the clock signal in the active interval of the horizontal active signal.

7. The apparatus of claim 1, wherein the horizontal active signal/synchronous signal restoring unit comprises:
   an image signal reception recognizing unit for recognizing reception of the image signal through the header and the tail separated in the first image signal processor;
   a horizontal active signal/synchronous signal controller for controlling generation of the horizontal active signal and counting predetermined number of clock signals according to the resolution information on the basis of the horizontal active signal, to thereby control generation of a horizontal synchronous signal; and
   a horizontal active signal/synchronous signal generator for generating a horizontal active signal and a horizontal synchronous signal under the control of the horizontal active signal/synchronous signal controller.

8. The apparatus of claim 7, wherein the horizontal active signal/synchronous signal controller judges resolution of the image signal by the resolution information inputted from the first image signal processor, counts clock signals from a position of a tail at a time point when the image signal is not received yet, and controls the horizontal active signal/synchronous signal generator according to the counted number of clock signals according to the resolution.

9. The apparatus of claim 1, wherein the vertical active signal/synchronous signal restoring unit comprises:
   a header discriminator for discriminating whether a header inputted from the image signal processor is a blanking header or an active header;
   a vertical active signal/synchronous signal controller for controlling generation of a vertical active signal according to an output signal of the header discriminator and counting predetermined number of horizontal synchronous signals according to resolution information on the basis of the vertical active signal, to thereby control generation of the vertical synchronous signal; and
   a vertical active signal/synchronous signal generator for generating a vertical active signal and a vertical synchronous signal under the control of the vertical active signal/synchronous signal controller.

10. The apparatus of claim 9, wherein the vertical active signal/synchronous signal controller generates a vertical active signal which is active during an interval where the active header is continuously recognized and is blank during an interval where the blanking header is continuously recognized.

11. An active signal/synchronous signal restoring apparatus comprising:
   an optical signal receiver for receiving an optical signal through an optical fiber from a source device;
   a serial/parallel converter for converting a serial data of the optical signal received from the optical signal receiver into 10 bit parallel data;
   a decoder for converting the 10 bit parallel data outputted from the serial/parallel converter into an 8-bit parallel data;
   an image signal processor for separating an image signal, a header and a tail from an image signal packet among output signals decoded from the decoder, and recognizing resolution information of the image signal through the image signal characteristic packet;
   a clock signal generator for generating a clock signal with a predetermined frequency according to the resolution information recognized by the image signal processor;
   a counter for counting a clock signal generated by the clock signal generator;

a maximum count value controller for setting a maximum count value according to the resolution information recognized by the image signal processor, and variably setting the maximum count value depending on whether the counter counts a pre-set maximum count value within a period of the header recognized by the image signal processor; and a horizontal active signal/synchronous signal generator for generating a horizontal active signal and a horizontal synchronous signal as the counter counts a pre-set value according to the resolution information recognized by the image signal processor.

12. The apparatus of claim 11, wherein the resolution information is recognized by the number of active headers successive in the image signal packet.

13. The apparatus of claim 11, wherein the maximum count value controller sets the counter to repeatedly count a maximum count value whenever a pre-set number of headers are inputted, and variably sets the maximum count value according to the repeated count result.

14. The apparatus of claim 13, wherein, before the header is inputted, if the maximum count completion number of the counter is greater than the pre-set value, the maximum count value controller adds 1 to the maximum count value of the counter, whereas if the header input number is greater than the pre-set value, the maximum count value controller subtracts 1 from the maximum count value of the counter.

15. An active signal/synchronous signal restoring method comprising:

a first step of setting a maximum count value of a counter according to resolution information recognized by an image signal processor;

a second step of judging whether a header has been inputted from the image signal processor;

a third step of resetting the counter and adding 1 to a clock signal count number (N) of the counter if a header is inputted from the image signal processor;

a fourth step of judging whether the counter has counted the pre-set maximum count value;

a fifth step of adding 1 to the maximum count completion number (A) if the counter has counted the pre-set maximum count value;

a sixth step of judging whether the clock signal count number (N) is greater than a pre-set value;

a seventh step of judging whether the count number (A) of the maximum count value of the counter before the header is inputted is greater than the pre-set value, if the clock signal count number (N) is greater than the pre-set value; and an eighth step of adding 1 to the maximum count value and setting the value at the counter, if the count number (A) is greater than the pre-set value.

16. The method of claim 15 further comprising:

judging whether a header has been inputted from a second image signal processor, if the counter has not counted the pre-set maximum count value.

17. The method of claim 15, wherein, if the clock signal count number (N) is not greater than the pre-set value, it returns to the second step to repeatedly perform the operation that a header is inputted, the counter is reset to count a clock signal again, and 1 is added to the clock signal count number (N).

18. The method of claim 15, wherein, if the counter has not counted the pre-set maximum count value, that is, if a header is inputted from the second image signal processor before the counter counts the maximum count value, 1 is added to the header input number (B), and it is judged whether the clock signal count number (N) is greater than the pre-set value, and if the clock signal count number (N) is not greater than the pre-set value, the operation that the counter is reset to count clock signals and 1 is added to the clock signal count number (N) is repeatedly performed.

19. The method of claim 15, wherein if the count number (A) is not greater than the pre-set value, it is judged whether the header input number (B) is greater than the pre-set value before the counter counts the maximum count value, and if the header input number (B) is greater than the pre-set value, 1 is subtracted from the maximum count value and set in the counter.

* * * * *